(12) United States Patent
Wang et al.

(10) Patent No.: US 11,388,083 B2
(45) Date of Patent: Jul. 12, 2022

(54) SECURE ROUTE IDENTIFICATION METHOD AND APPARATUS

(71) Applicant: HUAWEI TECHNOLOGIES CO., LTD., Guangdong (CN)

(72) Inventors: Donghui Wang, Beijing (CN); Hongpei Li, Beijing (CN); Bingyang Liu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 67 days.

(21) Appl. No.: 16/869,761

(22) Filed: May 8, 2020

(65) Prior Publication Data

US 2020/0267074 A1 Aug. 20, 2020

Related U.S. Application Data

(63) Continuation of application No. PCT/CN2019/126429, filed on Dec. 18, 2019.

(30) Foreign Application Priority Data

Dec. 28, 2018 (CN) .......................... 201811620079.2

(51) Int. Cl.
*H04L 45/02* (2022.01)
*H04L 45/00* (2022.01)
(Continued)

(52) U.S. Cl.
CPC ............ *H04L 45/02* (2013.01); *H04L 45/04* (2013.01); *H04W 40/246* (2013.01); *H04W 84/18* (2013.01)

(58) Field of Classification Search
CPC combination set(s) only.
See application file for complete search history.

(56) References Cited

U.S. PATENT DOCUMENTS 10,893,022 B1* 1/2021 Li ......................... H04L 45/748
2012/0291129 A1 11/2012 Shulman et al.
(Continued)

FOREIGN PATENT DOCUMENTS

CN 1976313 A 6/2007
CN 101102325 A 1/2008
(Continued)

OTHER PUBLICATIONS

Jordi Paillisse et al, "IPchain: Securing IP Prefix Allocation and Delegation with Blockchain", May 11, 2018, total 14 pages.
(Continued)

*Primary Examiner* — Xavier S Wong
(74) *Attorney, Agent, or Firm* — WHDA, LLP

(57) ABSTRACT

This application provides a secure route identification method and an apparatus. A first AS node receives a first message. The first message is used to indicate a target path for reaching a first route prefix, and the target path is used to indicate a first neighboring relationship between AS nodes on the target path. Then, the first AS node determines, based on the first neighboring relationship and neighbor information of an AS node on the target path that is stored in a blockchain, whether a security threat exists on the target path. The neighbor information of the AS node on the target (Continued)

path includes a second neighboring relationship between the AS node on the target path and another AS node.

20 Claims, 3 Drawing Sheets

(51) Int. Cl.
*H04W 40/24* (2009.01)
*H04W 84/18* (2009.01)

(56) References Cited

U.S. PATENT DOCUMENTS

| | | | |
|---|---|---|---|
| 2013/0097703 | A1 | 4/2013 | Ji et al. |
| 2017/0324738 | A1 | 11/2017 | Hari et al. |
| 2019/0079950 | A1* | 3/2019 | Ramabaja ............ H04L 9/0643 |
| 2020/0186458 | A1* | 6/2020 | Farag ................... H04L 9/0643 |

FOREIGN PATENT DOCUMENTS

| | | |
|---|---|---|
| CN | 101155054 A | 4/2008 |
| CN | 103442008 A | 12/2013 |
| CN | 104270307 A | 1/2015 |
| CN | 106059917 A | 10/2016 |
| CN | 106506274 A | 3/2017 |
| CN | 107302518 A | 10/2017 |
| CN | 108337173 A | 7/2018 |
| WO | 2006096560 A2 | 9/2006 |

OTHER PUBLICATIONS

Maria Apostolaki et al., "SABRE: Protecting Bitcoin against Routing Attacks", Aug. 19, 2018, total 16 pages.
Pavlas Sermpezis et al., "ARTEMIS: Neutralizing BGP Hijacking within a Minute", Jun. 27, 2018, total 16 pages.
Extended (Supplementary) European Search Report dated Feb. 25, 2021, issued in counterpart EP Application No. 19883339.4. (8 pages).
Office Action dated Dec. 10, 2020, issued in counterpart CN Application No. 201811620079.2, with English Translation. (13 pages).
Benjamin Fabian et al. Analyzing the Global-Scale Internet Graph at Different Topology Levels: Initial Graph Analysis, Technical Report Apr. 2016. total 4 pages.
Akmal Khan et al, AS-level Topology Collection through Looking Glass Servers, IMC 13, Oct. 23, 25, 2013, total 7 pages.
Qianqian Xing et al. POSTER: BGPCoin: A Trustworthy Blockchain-based Resource Management Solution for BGP Security, CCS 17, Oct. 30-Nov. 3, 2017, Dallas, TX, USA. pp. 2591-2593.
Adiseshu Hari et al. The Internet Blockchain: A Distributed, Tamper-Resistant Transaction Framework for the Internet, HotNets-XV, Nov. 9-10, 2016. pp. 204-210.
International Search Report dated Mar. 18, 2020, issued in counterpart Application No. PCT/CN2019/126429, with English Translation. (29 pages).

\* cited by examiner

SECURE ROUTE IDENTIFICATION METHOD AND APPARATUS

CROSS-REFERENCE TO RELATED APPLICATIONS

This application is a continuation of International Application No. PCT/CN2019/126429, filed on Dec. 18, 2019, which claims priority to Chinese Patent Application No. 201811620079.2 filed on Dec. 28, 2018. The disclosures of the aforementioned applications are hereby incorporated by reference in their entireties.

TECHNICAL FIELD

This application relates to the field of Internet technologies, and in particular, to a secure route identification method and an apparatus.

BACKGROUND

A global Internet is divided into many autonomous systems (AS). A carrier, an organization, or even a company in each country may apply for an AS and obtain an AS number, and a plurality of internet protocol (IP) addresses may be allocated within each AS. These IP addresses belong to the AS and can have a same route prefix or different route prefixes. Currently, during communication, an AS of a sender needs to know a route prefix owned by an AS of a receiver.

By publishing a border gateway protocol (BGP) update message, a source AS node may send a route prefix and an AS number that are of the source AS node to a neighboring AS node. The neighboring node adds an AS number of the neighboring node to the update message, and continues to send the BGP update message to a neighboring AS node, and the foregoing process is repeated. Other AS nodes may determine, based on the AS number carried in the update message, a route for reaching the route prefix owned by the source AS node, to communicate with the source AS node through the route.

However, when a route between ASs is advertised in the foregoing manner, whether a security threat exists cannot be identified. Therefore, a threat such as a path tampering attack or a route leakage is easily caused.

SUMMARY

This application provides a secure route identification method and an apparatus. The method and the apparatus may identify a security threat in a process of advertising a route between AS nodes.

According to a first aspect, this application provides a secure route identification method. A first AS node receives a first message, where the first message is used to indicate a target path for reaching a first route prefix, and the target path is used to indicate a first neighboring relationship between AS nodes on the target path. Then, the first AS node determines, based on the first neighboring relationship and neighbor information of an AS node on the target path that is stored in a blockchain, whether a security threat exists on the target link indicated by the first message.

According to the foregoing method, the first AS node may identify a security threat existing in a path advertised by another AS node, thereby improving security of route advertisement between AS nodes.

In a possible design, the neighbor information of the AS node on the target path may include a second neighboring relationship. The second neighboring relationship may be used to indicate all neighboring nodes of the AS node. When determining that the second neighboring relationship does not match the first neighboring relationship, the first AS node determines that a security threat exists on the target path indicated by the first message. According to this design, the first AS node may identify a path tampering attack existing on the target path, to further improve security of path advertisement between AS nodes.

In a possible design, if the first neighboring relationship specifically indicates that a second AS node is a neighboring node of a third AS node, and the second neighboring relationship is specifically used to indicate all neighboring nodes of the second AS node, where the second AS node has the first route prefix, when determining that the third AS node is not an AS node in all the neighboring nodes of the second AS node, the first AS node may determine that a security threat exists on the target path. According to this design, the first AS node only verifies that the neighboring relationship between the second AS node and the third AS node is stored in the blockchain, and can then verify whether a path tampering attack exists, thereby reducing calculation overheads for identifying the path tampering attack, and improving identification efficiency.

In a possible design, if the first neighboring relationship is used to indicate a neighboring node, on the target path, of each AS node on the target path, and the second neighboring relationship is specifically used to indicate all neighboring nodes of each AS node, the first AS node may determine, based on the second neighboring relationship, whether the neighboring node of each AS node on the target path matches all the neighboring nodes of each AS node that are indicated by the second neighboring relationship, and if yes, the first AS node determines that the second neighboring relationship matches the first neighboring relationship; otherwise, the first AS node determines that the second neighboring relationship does not match the first neighboring relationship. In an implementation, the first AS node may determine whether the neighboring node of each AS node on the target path indicated by the first neighboring relationship matches all the neighboring nodes of the AS node that are indicated by the second neighboring relationship.

For example, the first AS node may sequentially determine, based on a location relationship between the AS node and the first AS node on the target path in descending order of distances, whether the neighboring node of each AS node indicated by the first neighboring relationship matches all the neighboring nodes of the AS node that are indicated by the second neighboring relationship. When determining that a neighboring node of any AS node indicated by the first neighboring relationship does not match all the neighboring nodes of the AS node that are indicated by the second neighboring relationship, the first AS node determines that a potential risk exists on the target path. According to this design, a path tampering attack can be identified, to improve efficiency of identifying the path tampering attack.

In a possible design, if the neighbor information includes information used to indicate a business relationship between an AS node and a neighboring node on the target path, the first AS node may further determine, based on the first neighboring relationship and the information used to indicate the business relationship, whether route leakage occurs; and if yes, the first AS node determines that a security threat exists on the target path. According to this design, after receiving the first message, the first AS node may identify whether route leakage occurs on the target path indicated by the first message, thereby further improving security of path advertisement between AS nodes.

In a possible design, if the neighbor information includes information used to indicate a business relationship between an AS node and a neighboring node on the target path, and information used to indicate a transfer policy corresponding to the first route prefix, the first AS node may determine, based on the information used to indicate the business relationship, the information used to indicate the transfer policy corresponding to the first route prefix, and the first neighboring relationship, whether the target path matches the transfer policy, and if yes, the first AS node determines that a security threat exists on the target path. According to this design, the first AS node may identify whether the target path conforms to the transfer policy corresponding to the route prefix reached by the target path. If the target path does not conform to the transfer policy, it is identified that a security threat exists on the target path, thereby further improving security of path advertisement between AS nodes.

In a possible design, the first AS node may discard the first message after determining that a security threat exists on the target path. According to this design, once the first AS node identifies a path in which a security threat exists, the first AS node discards a message indicating the path, to avoid a network security vulnerability caused by storing the path, and avoid further publishing of the message, thereby improving security of path advertisement between AS nodes.

In a possible design, the first AS node may further publish the neighbor information of the first AS node to the blockchain before receiving the first message, the neighbor information of the first AS node includes but is not limited to some or all of the following information: information used to indicate all neighboring nodes of the first AS node, information used to indicate a business relationship between the first AS node and a neighboring node, or information used to indicate a transfer policy corresponding to a second route prefix owned by the first AS node. According to this design, the first AS node may publish the neighbor information of the first AS node to the blockchain, and then another node in the blockchain may write the neighbor information of the first AS node into the blockchain, so that the neighbor information is synchronized in the entire network, and is used by another AS node to verify, based on the secure route identification method provided in this application, whether a security threat exists in a path including the first AS node, to improve security of path advertisement between AS nodes.

According to a second aspect, this application provides a network node. The network node has a function of implementing behavior of the first AS node in the method instance of the first aspect. The function may be implemented by hardware or software, or may be implemented by hardware executing corresponding software. The hardware or the software includes one or more modules corresponding to the foregoing function.

In a possible implementation, a structure of the network node may include a transceiver unit and a processing unit, and these units may perform corresponding functions in the method example of the first aspect described above. For details, refer to the detailed description in the method example. For details, refer to detailed descriptions in the method example. Details are not described herein again.

In a possible implementation, a structure of the network node may include a transceiver, a memory, and a processor. The transceiver is used by the network node to perform communication, for example, is configured to receive the first message received by the first AS node in the method provided in the first aspect. The processor is configured to support the network node in performing a corresponding function in the method provided in the first aspect. The memory is coupled to the processor, and is configured to store a program instruction and data that are necessary to the network node.

According to a third aspect, this application further provides a computer-readable storage medium, storing an instruction. When the instruction is run on a computer, the computer is enabled to perform the method according to any one of the first aspect or the possible designs of the first aspect.

According to a fourth aspect, an application further provides a computer program product including an instruction. When the instruction is run on a computer, the computer is enabled to perform the method according to any one of the first aspect or the possible designs of the first aspect.

According to a fifth aspect, this application further provides a system. The system includes the network node according to any one of the possible designs of the second aspect.

According to a sixth aspect, this application further provides a chip. The chip includes a processor and a memory. The memory stores a program instruction. The processor is configured to execute the program instruction in the memory, to implement the method according to any one of the first aspect or the possible design of the first aspect.

For technical effects brought by the second aspect to the sixth aspect, refer to the descriptions in the first aspect. Details are not described herein again.

DESCRIPTION OF EMBODIMENTS

Figure 1:
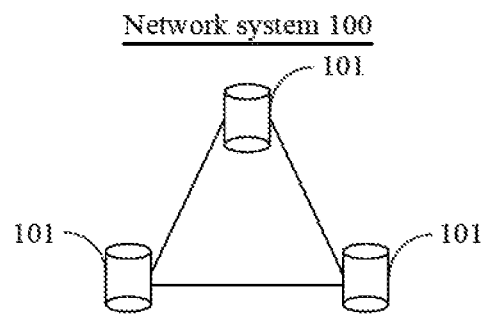
FIG. 1 is a schematic architectural diagram of a network system according to an embodiment of this application.

It should be understood that, in the embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be singular or plural. The character "/" usually indicates an "or" relationship between the associated objects. "At least one of the following (items)" or a similar expression thereof means any combination of these items, including any combination of a single item (item) or plural items (item). For example, at least one of a, b, or c may indicate: a, b, c, a and b, a and c, b and c, or a, b, and c, where a, b, and c may be a single item, or may be a plurality of items.

The following explains terms used or possibly used in this application.

1. At least one means one or more, that is, including one, two, three, or more.

2. Carrying may mean that a message is used to carry information or data, or may mean that a message includes information.

3. A path tampering attack is a tampering attack performed by a malicious attack node on a route known to an AS node. The attack node may claim that a path including the attack node and reaching a route prefix is shorter than a path, known to the AS node, for reaching the route prefix. When learning that a shorter path that can reach the route prefix exists, the AS node replaces the known path for reaching the route prefix with the path claimed by the attacker node. However, the path claimed by the attacker node cannot reach the route prefix. In this way, the malicious attack node hijacks traffic sent by the AS node to the route prefix.

4. Route leakage refers to a route error or disorder caused by violation of a rule of transferring a route indication message in a process of transferring a route for reach a route prefix. The rule of transferring the route indication message is related to a business relationship between AS nodes. The route indication message herein is used to indicate a path for reaching a route prefix, and the message may be a BGP update message. The business relationship may be used to indicate a customer node and a service provider node in neighboring AS nodes. For example, in the neighboring AS nodes, an AS node is a customer node of another AS node, and the another AS node is a provider node of the AS node. Alternatively, the business relationship is used to indicate that all neighboring AS nodes are peer nodes, for example, the neighboring AS nodes are peer nodes of each other. An AS node can learn of a business relationship between the AS node and a neighboring AS node. Usually, when a route for reaching a route prefix is transferred among three AS nodes by using a route indication message, it should be ensured that a route indication message from a customer node is allowed to be transferred to the customer node, a peer node, and a provider node. A route indication message from a peer node is allowed to be transferred to a customer node but is not allowed to be transferred to a peer node or a provider node. A route indication message from a provider node is allowed to be transferred to a customer node but is not allowed to be transferred to a peer node or a provider node. Otherwise, route leakage occurs.

5. A path, or referred to as a route, is a path from one AS node to a route prefix owned by another AS node in this application. Based on the path, a hop is from one AS node to another AS node. A hop count of the path represents a quantity of times for which information is sent from one AS node to another AS node based on the path. It may be understood that the hop count is equal to a quantity of all AS nodes included on the path minus one.

The following describes the embodiments of this application in detail with reference to the accompanying drawings. First, a system provided in the embodiments of this application is described. Then a device and an apparatus for performing a route determining method provided in the embodiments of this application are described. Finally, a specific implementation of the route determining method provided in the embodiments of this application is described.

As shown in FIG. 1, a network system 100 provided in an embodiment of this application may include a plurality of AS nodes 101, and the AS node 101 may include an AS server. The AS node 101 may implement communication through a network interface. For example, a first message in this embodiment of this application may be transmitted between the AS nodes 101. The network interface herein includes but is not limited to an optical fiber link interface, an Ethernet interface, and a copper line interface. The AS node 101 may further include one or more BGP routers, and data transmission based on a transmission control protocol (TCP) may be performed between the BGP routers.

In the network system 100 shown in FIG. 1, the at least one AS node 101 may publish information to a blockchain, and/or obtain information stored in the blockchain. Specifically, the AS node 101 may publish information such as an AS number of another AS node 101 neighboring to the AS node 101 to the blockchain, and after verification performed by the another AS node (for example, if the AS node 101 publishes information through a transaction, the another AS node verifies the transaction), write the information into the blockchain. Alternatively, the AS node 101 may read, from the blockchain, information such as an AS number of a neighboring AS node stored in another AS node 101.

Figure 2:
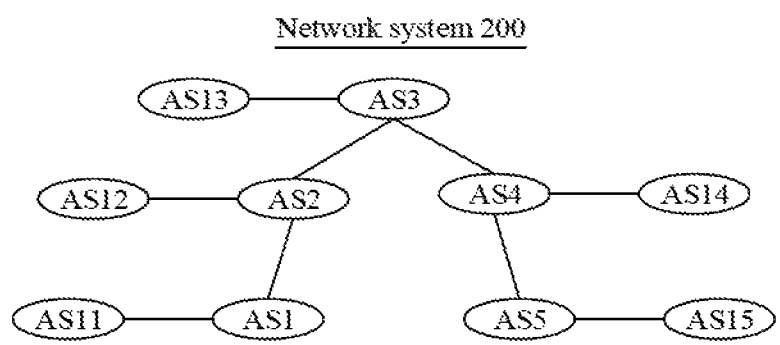
FIG. 2 is a schematic architectural diagram of another network system according to an embodiment of this application.

In addition, in this application, all the AS nodes 101 may interact with the blockchain, so that each AS node 101 can store transaction information in the blockchain, and another AS node 101 may obtain the information stored in the blockchain, to implement information synchronization. For example, as shown in FIG. 2, if applied to an Ethereum blockchain system, the network system 100 may include a plurality of AS nodes, and AS numbers of the plurality of AS nodes are respectively AS1 to AS5, and AS11 to AS15. AS1 to AS5 and AS11 to AS15 are autonomous system nodes in the Ethereum blockchain system. In addition, a straight line shown in FIG. 2 may indicate that the AS nodes are neighboring nodes.

It should be understood that, in the network system 100 shown in FIG. 1 or a network system 200 shown in FIG. 2, if two AS nodes can communicate with each other, the two AS nodes are neighboring nodes of each other.

Figure 3:
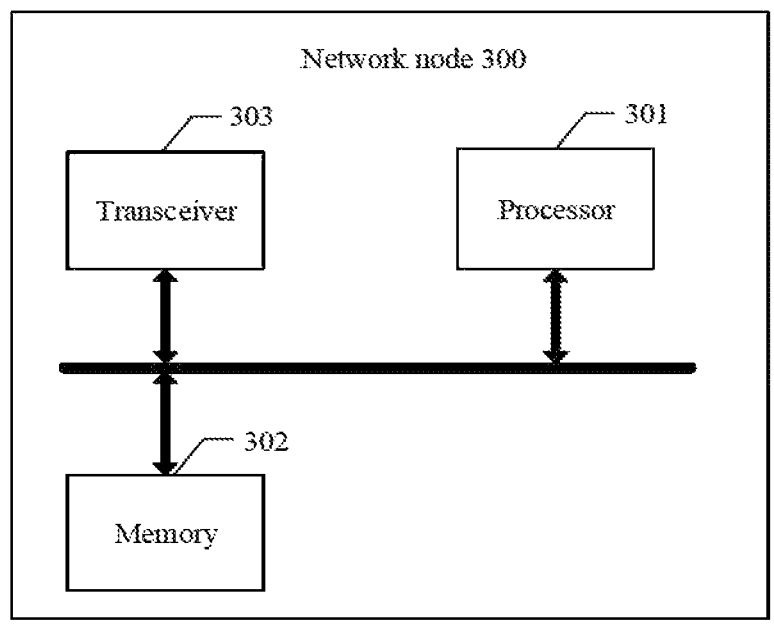
FIG. 3 is a schematic structural diagram of a network node according to an embodiment of this application.

The route determining method provided in the embodiments of this application may be implemented by a network node 300 shown in FIG. 3. As shown in FIG. 3, the network node 300 may include a processor 301, a memory 302, and a transceiver 303. The memory 302 is configured to store a program instruction, an instruction, and data. The transceiver 303 may be configured to support the network node 300 in performing communication. For example, the transceiver 303 may be configured to send a message generated by the processor 301, or receive a message sent by another network node. The transceiver 303 may be a wireless network transceiver. The transceiver 303 may alternatively be a communications interface. The communications interface may be an optical fiber link interface, an Ethernet interface, a copper line interface, or the like. The processor 301 may invoke the program instruction and/or the instruction in the memory 302, to implement a secure route identification method provided in the embodiments of this application, to identify a security threat in a path advertised by an AS node. A connection medium between the processor 301, the memory 302, and the transceiver 303 is not limited in this embodiment of this application. The processor 301, the memory 302, and the transceiver 303 may be connected through a bus, or may be connected by using another connection medium. It should be understood that the network node 300 may be an AS server or a BGP router included in the AS node 101. The network node 300 may alternatively be implemented by a chip or another apparatus.

Figure 4:
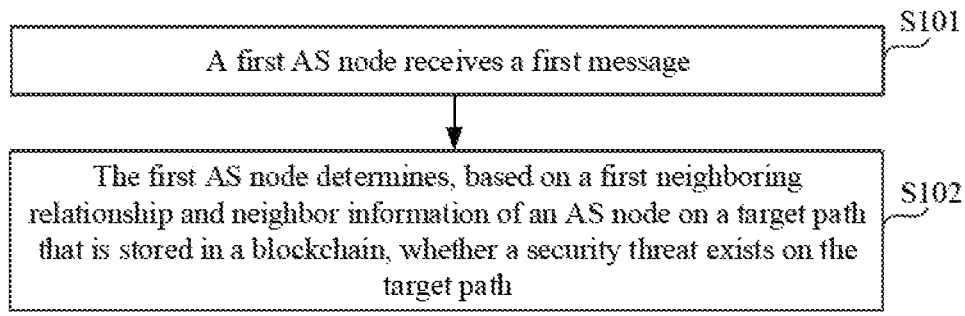
FIG. 4 is a schematic flowchart of a procedure of a secure route identification method according to an embodiment of this application.

The following describes a route determining method provided in an embodiment of this application with reference to FIG. 4. The method may include the following steps.

S101. A first AS node receives a first message, where the first message is used to indicate a target path for reaching a first route prefix, and the target path is used to indicate a first neighboring relationship between AS nodes on the target path.

S102. The first AS node determines, based on the first neighboring relationship and neighbor information of an AS node on the target path that is stored in a blockchain, whether a security threat exists on the target path.

According to the foregoing method, the first AS node may identify, based on the first neighboring relationship in the first message and the neighbor information of the AS node on the target path that is stored in the blockchain, whether a security threat exists on the target path, thereby providing a solution for identifying a security threat in a process of advertising a route between AS nodes, and improving security of a process of route advertisement between AS nodes.

The first message in this application may be a BGP update message. Specifically, an AS_PATH field of the BGP update message may carry information used to indicate the target path. The target path may be represented by a plurality of AS numbers of AS nodes that are written successively, where AS nodes to which two AS numbers that are written successively respectively belong are neighboring nodes. Therefore, the first neighboring relationship between the AS nodes on the target path may be represented by using a plurality of neighboring AS numbers.

Specifically, the network system 200 shown in FIG. 2 is used as an example. If the node AS1 has a route prefix 16.0.0.0/16, the node AS1 may add 16.0.0.0/16 to network layer reachability information (NLRI) of the BGP update message, to indicate that the BGP update message indicates a target path for reaching the target route prefix 16.0.0.0/16. The node AS1 may further add an AS number AS1 to the AS_PATH field, to indicate that reaching the target route prefix 16.0.0.0/16 needs to reach AS1. If the node AS1 sends the BGP update message to the node AS2, after receiving the update message, the node AS2 updates a target path that is stored by the node AS2 and that is for reaching the target route prefix 16.0.0.0/16 to a path from the node AS2 to the node AS1, and adds an AS number AS2 of the node AS2 to the AS_PATH domain. The BGP update message indicates that reaching the target route prefix 16.0.0.0/16 needs to reach the node AS1 through the node AS2. Then the node AS2 may send the BGP update message to the node AS3. After receiving the BGP update message, the node AS3 may repeat the foregoing process.

If the node AS5 shown in FIG. 2 is used as the first AS node, when the BGP update message is sent by the node AS1 and reaches the node AS5 after successively passing through the node AS2, the node AS3, and the node AS4, the AS_PATH field in the BGP update message includes the following AS numbers: AS4, AS3, AS2, and AS1, indicating that to reach the route prefix 16.0.0.0/16 from the node AS5, the BGP update message needs to successively pass through the node AS4, the node AS3, and the node AS2 from the node AS5 and finally reaches the node AS1. That is, the target path includes the node AS5, the node AS4, the node AS3, the node AS2, and the node AS1. The node AS5 and the node AS4 are neighboring nodes, the node AS4 and the node AS3 are neighboring nodes, the node AS3 and the node AS2 are neighboring nodes, and the node AS2 and the node AS1 are neighboring nodes. Therefore, the foregoing target path may be used to indicate that the first neighboring relationship includes a neighboring relationship between the node AS5 and the node AS4, a neighboring relationship between the node AS4 and the node AS3, a neighboring relationship between the node AS3 and the node AS2, and a neighboring relationship between the node AS2 and the node AS1.

In addition, the first message may further carry an AS number used to indicate an AS node neighboring to an AS node on the target path, to indicate a neighboring relationship between the AS node and the neighboring AS node on the target path. For example, the first message may carry a neighbor list of the AS node on the target path, and the neighbor list may include the AS number of the neighboring node of the AS node on the target path.

Specifically, the network system 200 shown in FIG. 2 is still used as an example. If the target path is used to indicate that to reach the route prefix, the BGP update message needs to start from the node AS5, then successively passes through the node AS4, the node AS3, and the node AS2, and finally reaches the node AS1. That is, the target path includes the node AS1, the node AS2, the node AS3, the node AS4, and the node AS5. Neighboring nodes of the AS nodes on the target path may be represented by using the neighbor list shown in Table 1. An AS node associated with an AS number in a column of "neighboring node" in the table represents a neighboring node of an AS node associated with an AS number shown in a column of "AS node" in a same row in the table. As shown in Table 1, on the target link, a neighboring node of the node AS1 is the node AS2, neighboring nodes of the node AS2 are the node AS1 and the node AS3, neighboring nodes of the node AS3 are the node AS2 and the node AS4, neighboring nodes of the node AS4 are the node AS3 and the node AS5, and a neighboring node of the node AS5 is the node AS4.

TABLE 1

| AS node | Neighboring Node |
| --- | --- |
| AS1 | AS2 |
| AS2 | AS1, AS3 |
| AS3 | AS2, AS4 |
| AS4 | AS3, AS5 |
| AS5 | AS4 |

It should be understood that the foregoing manner of indicating the first neighboring relationship is merely an example for description. This application does not limit the first neighboring relationship in the first message to be indicated only by using the AS number in the AS_PATH field of the BGP update message or only by using the neighbor list shown in Table 1. For example, alternatively, the first neighboring relationship may be indicated in a combination of the foregoing two manners, or the first neighboring relationship may be indicated in another explicit or implicit indication manner.

In an implementation, the neighbor information of the AS node on the target path that is stored in the blockchain may be preconfigured in the blockchain, or may be published by the AS node on the target path in the blockchain.

For example, the neighbor information of the AS node on the target path that is stored in the blockchain may include a second neighboring relationship, and the second neighboring relationship may be used to indicate all neighboring nodes of the AS node on the target path.

The second neighboring relationship in this application may include AS numbers of all the neighboring nodes of the AS node on the target path. It should be understood that all the neighboring nodes described herein include but are not limited to nodes on the target link. In an implementation, the second neighboring relationship may be used to indicate all neighboring nodes of an AS node on each target path in a network system in which the AS node is located. The second neighboring relationship may be written into the blockchain, to synchronize the second neighboring relationship in the entire network. The first AS node may obtain the second neighboring relationship stored in the blockchain.

Specifically, the second neighboring relationship may alternatively be represented as a neighbor list. The network system 200 shown in FIG. 2 is still used as an example. If the target path is used to indicate that to reach the route prefix, the BGP update message needs to start from the node AS5, then successively passes through the node AS4, the node AS3, and the node AS2, and finally reaches the node AS1. That is, the target path includes the node AS1, the node AS2, the node AS3, the node AS4, and the node AS5. Neighboring nodes of the node AS1, the node AS2, the node AS3, the node AS4, and the node AS5 are shown in Table 2. It can be learned from Table 2 that neighboring nodes of the node AS1 on the target path include the node AS11 and the node AS2. Neighboring nodes of the node AS2 on the target path include the node AS12, the node AS1, and the node AS3. Neighboring nodes of the node AS3 on the target path include the node AS13, the node AS2, and the node AS4. Neighboring nodes of the node AS4 on the target path include the node AS14, the node AS3, and the node AS5. Neighboring nodes of the node AS5 on the target path include the node AS15 and the node AS4.

TABLE 2

| AS node | Neighboring Node |
|---------|------------------|
| AS1 | AS11, AS2 |
| AS2 | AS11, AS1, AS3 |
| AS3 | AS13, AS2, AS4 |
| AS4 | AS14, AS3, AS5 |
| AS5 | AS15, AS4 |

It should be understood that the foregoing manner of indicating the second neighboring relationship is merely an example for description. This application does not limit the first neighboring relationship in the first message to be indicated only by using a neighbor list shown in Table 2. For example, alternatively, the second neighboring relationship may be indicated in another explicit or implicit indication manner.

In addition, it should be understood that a neighbor list may be stored in the blockchain to indicate the second neighboring relationship. The neighbor list may include AS numbers of neighboring nodes of a plurality of or all the AS nodes in the network system 200. The blockchain may alternatively store a plurality of neighbor lists, and each neighbor list is used to store AS numbers of neighboring nodes of one or more AS nodes.

In an implementation of the step shown in S102, after receiving the first message, the first AS node may determine whether one or more security threats such as a path tampering attack, route leakage, or a case in which the target path for reaching the first route prefix does not match a transfer policy corresponding to the first route prefix exist on the target path indicated by the first message. If yes, it is determined that a security threat exists.

In an implementation of the step shown in S102, when determining that the second neighboring relationship does not match the first neighboring relationship, the first AS node may determine that a path tampering attack exists. In this case, the first AS node may determine that a security threat exists on the target path indicated by the first message. It should be understood that if the first neighboring relationship of the target path indicated by the first message does not match the second neighboring relationship synchronized in the entire network, it may be considered that the target path indicated by the first message has a relatively low reliability. In this case, the first AS node may determine that a security threat exists on the target path indicated by the first message.

Specifically, in a possible implementation, if the first neighboring relationship is used to indicate that a second AS node is a neighboring node of a third AS node, where the second AS node has the first route prefix, and both the second AS node and the third AS node are located on the target link, when determining whether the second neighboring relationship matches the first neighboring relationship, the first AS node may determine whether the third AS node is one of all neighboring nodes of the second AS node that are indicated by the second neighboring relationship. If yes, it may be determined that the second neighboring relationship matches the first neighboring relationship. Otherwise, if the third AS node is none of neighboring nodes of the second AS node that are indicated by the second neighboring relationship, it may be determined that the second neighboring relationship does not match the first neighboring relationship. In this case, it may be determined that a security threat exists on the target link. It should be understood that the third AS node herein may be a same AS node as the first AS node.

The network system 200 shown in FIG. 2 is still used as an example. The node AS1 has a route prefix 16.0.0.0/16. If the node AS1 sends a first message to the node AS5 to initiate a path tampering attack, a target path that is indicated by the first message and that is for reaching the route prefix is a path starting from the node AS5 and reaching the node AS1, that is, a first neighboring relationship indicated by the target path specifically indicates that the node AS1 and the node AS5 are neighboring nodes of each other. If the second neighboring relationship stored in the blockchain is shown in Table 2, the node AS5 may obtain the second neighboring relationship from the blockchain, and the second neighboring relationship is used to indicate all neighboring nodes of the node AS1. Then, after determining, based on, for example, Table 2, that all the neighboring nodes of the AS1 do not include the node AS5, the node AS5 determines that the second neighboring relationship does not match the first neighboring relationship. Therefore, it is determined that a security threat exists on the target path.

In another possible implementation, if the first neighboring relationship specifically indicates a neighboring node, on the target path, of each AS node on the target path, and the second neighboring relationship specifically indicates all neighboring nodes of each AS node on the target path, the first AS node may further determine, based on the second neighboring relationship, whether the neighboring node, on the target path, of each AS node indicated by the first neighboring relationship matches all the neighboring nodes of each AS node that are indicated by the second neighboring relationship. If yes, it may be determined that the second neighboring relationship matches the first neighboring relationship. If a result of any one of the determining is no, it is determined that the second neighboring relationship does not match the first neighboring relationship. Specifically, when determining whether the neighboring node, on the target path, of each AS node indicated by the first neighboring relationship matches all the neighboring nodes of each AS node that are indicated by the second neighboring relationship, the first AS node may compare the neighboring node of each AS node indicated by the first neighboring relationship with all the neighboring nodes of each AS node that are indicated by the second neighboring relationship.

The network system 200 shown in FIG. 2 is still used as an example. The node AS1 has a route prefix 16.0.0.0/16. The target path that is indicated by the first message received by the node AS5 and that is for reaching the route prefix 16.0.0.0/16 specifically includes: starting from the node AS5, successively passing through the node AS4, the node AS3, and the node AS2, and finally reaching the node AS1. That is, the target path inches the node AS1, the node AS2, the node AS3, the node AS4, and the node AS5. The first neighboring relationship indicated by the target path may be represented as the neighbor list described in Table 1. If a second neighboring relationship between each of the node AS5, the node AS4, the node AS3, the node AS2, and the node AS1 that are stored in the blockchain and another AS node may be represented as the neighbor list shown in Table 2, the node AS5 may separately determine whether the neighboring node of the node AS5 in Table 1 is included in the neighboring nodes of the node AS5 in Table 2, whether the neighboring nodes of the node AS4 in Table 1 are included in the neighboring nodes of the node AS4 in Table 2, whether the neighboring nodes of the node AS3 in Table 1 are included in the neighboring nodes of the node AS3 in Table 2, whether the neighboring nodes of the node AS2 in Table 1 are included in the neighboring nodes of the node AS2 in Table 2, and whether the neighboring node of the node AS1 in Table 1 is included in the neighboring nodes of the node AS1 in Table 2. If a result of any determining is a negative result, the node AS5 may determine that the second neighboring relationship does not match the first neighboring relationship, to determine that a security threat exists on the target path. In addition, the node AS5 may no longer continue to perform a determining process that is not performed in the foregoing determining process.

Specifically, the node AS5 may perform determining in the following order. First, the node AS5 determines whether the neighboring node of the node AS1 in Table 1 is included in the neighboring nodes of the node AS1 in Table 2. If a determining result is a negative result, the node AS5 may determine that a security threat exists on the target path indicated by the first message. If a determining result is a positive result, the node AS5 may further determine whether the neighboring nodes of the node AS2 in Table 1 are included in the neighboring nodes of the node AS2 in Table 2. If the neighboring nodes of the node AS2 in Table 1 are not included in the neighboring nodes of the node AS2 in Table 2, the node AS5 may determine that a security threat exists on the target path indicated by the first message. Otherwise, if the neighboring nodes of the node AS2 in Table 1 are included in the neighboring nodes of the node AS2 in Table 2, the node AS5 may further determine whether the neighboring nodes of the node AS3 in Table 1 are included in the neighboring nodes of the node AS3 in Table 2. If the neighboring nodes of the node AS3 in Table 1 are not included in the neighboring nodes of the node AS3 in Table 2, the node AS5 may determine that a security threat exists on the target path indicated by the first message. Otherwise, if the neighboring nodes of the node AS3 in Table 1 are included in the neighboring nodes of the node AS3 in Table 2, the node AS5 may further determine whether the neighboring nodes of the node AS4 in Table 1 are included in the neighboring nodes of the node AS4 in Table 2. If the neighboring nodes of the node AS4 in Table 1 are not included in the neighboring nodes of the node AS4 in Table 2, the node AS5 may determine that a security threat exists on the target path indicated by the first message. Otherwise, if the neighboring nodes of the node AS4 in Table 1 are included in the neighboring nodes of the node AS4 in Table 2, the node AS5 may further determine whether the neighboring node of the node AS5 in Table 1 is included in the neighboring nodes of the node AS5 in Table 2. If the neighboring node of the node AS5 in Table 1 is not included in the neighboring nodes of the node AS5 in Table 2, the node AS5 may determine that a security threat exists on the target path indicated by the first message. Otherwise, if the neighboring node of the node AS5 in Table 1 is included in the neighboring nodes of the node AS5 in Table 2, the node AS5 may determine that no route leakage occurs on the target path.

According to the foregoing solution, the node AS5 separately determines, based on the target path in descending order of distances, whether a neighboring node, on the target path, of each AS node indicated by the first neighboring relationship matches all the neighboring nodes of each AS node that are indicated by the second neighboring relationship. This can improve efficiency of identifying a path tampering attack.

In an implementation of the step shown in S102, if the neighbor information of the AS node on the target path that is stored in the blockchain further includes information used to indicate a business relationship between an AS node and a neighboring node on the target path, the first AS node may further determine, based on the first neighboring relationship and the information used to indicate the business relationship, whether route leakage occurs on the target path, to identify whether a security threat exists.

Specifically, if the first neighboring relationship specifically indicates that a fourth AS node is neighboring to a fifth AS node on the target path, and indicates that the fifth AS node is neighboring to the first AS node, where the fourth AS node and the fifth AS node are AS nodes on the target path; in addition, the target path further indicates that to reach the first route prefix, the fifth AS node needs to be reached from the first AS node, and then the fourth AS node is reached from the fifth AS node; and if the neighbor information of the AS node on the target path further includes information used to indicate a business relationship between the fourth AS node and the fifth AS node, and information used to indicate a business relationship between the fifth AS node and the first AS node, the first AS node may determine, based on the business relationship between the fourth AS node and the fifth AS node and the business relationship between the fifth AS node and the first AS node, whether route leakage occurs on the target path.

Specifically, when determining that one or more of the following conditions are met, the first AS node may determine that route leakage occurs:

Condition 1: The first AS node is a provider node of the fifth AS node, and the fifth AS node is a customer node of the fourth AS node.

If the first AS node determines, based on the business relationship between the fourth AS node and the fifth AS node, that the fifth AS node is the customer node of the fourth AS node, and determines, based the business relationship between the fifth AS node and the first AS node, that the first AS node is the provider node of the fifth AS node, the first AS node determines that route leakage occurs on the target path.

The network system 200 shown in FIG. 2 is used as an example. If the first message received by the node AS5 indicates that on the target path, the node AS4 is reached from the node AS5, and then the node AS3 is reached from the node AS4, if the node AS5 determines, based on the information that is stored in the blockchain and that is used to indicate a business relationship between the node AS5 and the AS node and information that is stored in the blockchain and that is used to indicate a business relationship between the node AS4 and the node AS3, that the node AS5 is a provider node of the node AS4 and the node AS4 is a customer node of the node AS3, the node AS4 determines that route leakage occurs on the target path indicated by the first message.

Condition 2: The first AS node is a peer node of the fifth AS node, and the fifth AS node is a peer peer node of the fourth AS node.

If the first AS node determines, based on the business relationship between the fourth AS node and the fifth AS node, that the fifth AS node is the peer peer node of the fourth AS node, and determines, based the business relationship between the fifth AS node and the first AS node, that the first AS node is the peer node of the fifth AS node, the first AS node determines that route leakage occurs.

The network system 200 shown in FIG. 2 is still used as an example. If the first message received by the node AS5 indicates that on the target path, the node AS4 is reached from the node AS5, and then the node AS3 is reached from the node AS4, if the node AS5 determines, based on the information that is stored in the blockchain and that is used to indicate a business relationship between the node AS5 and the AS node and information that is stored in the blockchain and that is used to indicate a business relationship between the node AS4 and the node AS3, that the node AS5 is a peer node of the node AS4 and the node AS4 is a peer node of the node AS3, the node AS4 determines that route leakage occurs on the target path indicated by the first message.

Condition 3: The first AS node is a provider node of the fifth AS node, and the fifth AS node is a peer node of the fourth AS node.

If the first AS node determines, based on the business relationship between the fourth AS node and the fifth AS node, that the fifth AS node is the peer node of the fourth AS node, and determines, based the business relationship between the fifth AS node and the first AS node, that the first AS node is the provider node of the fifth AS node, the first AS node determines that route leakage occurs.

The network system 200 shown in FIG. 2 is still used as an example. If the first message received by the node AS5 indicates that on the target path, the node AS4 is reached from the node AS5, and then the node AS3 is reached from the node AS4, if the node AS5 determines, based on the information that is stored in the blockchain and that is used to indicate a business relationship between the node AS5 and the AS node and information that is stored in the blockchain and that is used to indicate a business relationship between the node AS4 and the node AS3, that the node AS5 is a provider node of the node AS4 and the node AS4 is a peer node of the node AS3, the node AS4 determines that route leakage occurs on the target path indicated by the first message.

Condition 4: The first AS node is a peer node of the fifth AS node, and the fifth AS node is a customer node of the fourth AS node.

If the first AS node determines, based on the business relationship between the fourth AS node and the fifth AS node, that the fifth AS node is the customer node of the fourth AS node, and determines, based the business relationship between the fifth AS node and the first AS node, that the first AS node is the peer node of the fifth AS node, the first AS node determines that route leakage occurs.

The network system 200 shown in FIG. 2 is still used as an example. If the first message received by the node AS5 indicates that on the target path, the node AS4 is reached from the node AS5, and then the node AS3 is reached from the node AS4, if the node AS5 determines, based on the information that is stored in the blockchain and that is used to indicate a business relationship between the node AS5 and the AS node and information that is stored in the blockchain and that is used to indicate a business relationship between the node AS4 and the node AS3, that the node AS5 is a peer node of the node AS4 and the node AS4 is a customer node of the node AS3, the node AS4 determines that route leakage occurs on the target path indicated by the first message.

It should be understood that, the foregoing descriptions of the conditions for determining whether route leakage occurs are merely examples. In an implementation, the first AS node may determine that route leakage occurs on the target path, provided that the first AS node determines, based on the business relationship between the neighboring AS nodes on the target path, that the first message violates a transfer rule of a route indication message. When a route indication message used to indicate a path is transferred between three AS nodes, a transfer rule of the route indication message includes: a route indication message from a customer node is allowed to be transferred to a customer node, a peer node, and a provider node; a route indication message from a peer node is allowed to be transferred to a customer node but is not allowed to be transferred to a peer node or a provider node; and a route indication message from a provider node is allowed to be transferred to a customer node but is not allowed to be transferred to a peer node or a provider node.

In the foregoing example, the first AS node may obtain, from the blockchain, the information used to indicate the business relationship between the fourth AS node and the fifth AS node and the information used to indicate the business relationship between the fifth AS node and the first AS node.

For example, the neighbor information of the AS node on the target path that is stored in the blockchain may include information used to indicate a business relationship between an AS node and each of the other AS nodes on the target link. For example, if the target path is used to indicate that to reach a route prefix, the BGP update message needs to start from the node AS5 shown in FIG. 2, successively passes through the node AS4, the node AS3, and the node AS2, and finally reaches the node AS1. The blockchain may store information used to indicate a business relationship between the node AS5 and the node AS4, information used to indicate a business relationship between the node AS4 and the node AS3, information used to indicate a business relationship between the node AS3 and the node AS2, and information used to indicate a business relationship between the node AS2 and the node AS1 in the network system 200 shown in FIG. 2.

Figure 5:
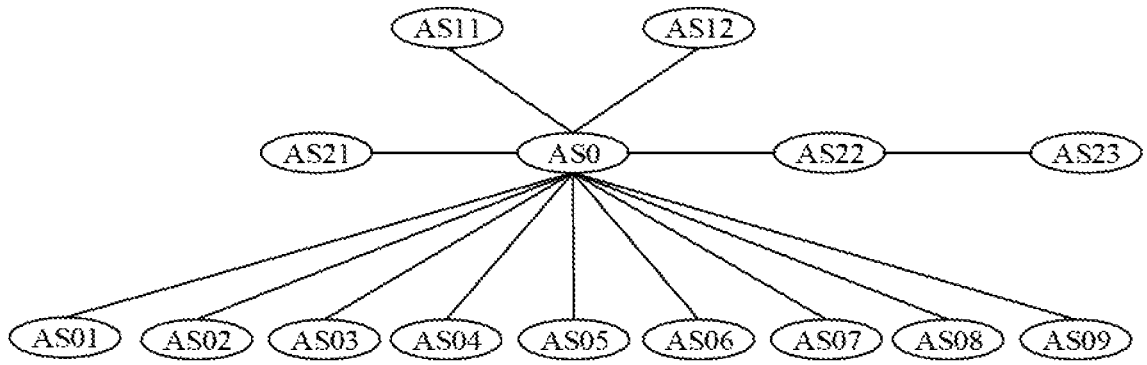
FIG. 5 is a schematic diagram of a topology relationship between network nodes according to an embodiment of this application.

For another example, a diagram of a topology relationship between a node AS0 and neighboring nodes is shown in FIG. 5. It can be learned that the neighboring nodes of the node AS0 include a node AS01 to a node AS09, a node AS11, a node AS12, a node AS21, and a node AS22. The node AS11 and the node AS12 are provider nodes of the node AS0. The AS21 and the AS22 are peer nodes of the node AS0. The node AS01 to the node AS09 are customer nodes of the node AS0. The blockchain may store information used to indicate that the node AS11 and the node AS12 are provider nodes of the node AS0, information used to indicate that the node AS21 and the node AS22 are peer nodes of the node AS0, and information used to indicate that the node AS01 to the node AS09 are customer nodes of the node AS0.

Specifically, the information used to indicate the business relationship between the AS node and each of the other AS nodes may be stored as a hash list in the blockchain. Both a key and a value of the hash list are stored in 256 bits, and an unoccupied key-value pair in the hash list may be set to 0. The key may be used to describe a business relationship, and the value corresponding to the key may be used to describe a neighboring node that meets the business relationship.

For example, the blockchain may store neighbor information of the node AS0 as a neighbor list shown in Table 3, to reflect a business relationship between the node AS0 and another neighboring AS node. In the table, a key in the third row represents the first piece of information (one piece in total) about the provider nodes of the node AS0, and a value corresponding to the key is "AS11, AS12", indicating that the node AS11 and the node AS12 are provider nodes of the node AS0. In the table, a key in the fourth row represents the first piece of information (one piece in total) of the peer nodes of the node AS0, and a value corresponding to the key is "AS21, AS22", indicating that the node AS21 and the node AS22 are peer nodes of the node AS0. In the table, a key in the fifth row represents the first record (two records in total) of the customer nodes of AS0, and a value corresponding to the key is "AS01, AS02, AS03, AS04, AS05, AS06, AS07, AS08", indicating that the node AS01, the node AS02, the node AS03, the node AS04, the node AS05, the node AS06, the node AS07, and the node AS08 are customer nodes of AS0. In the table, a key in the sixth row represents the second piece of information (two pieces in total) about the customer nodes of the node AS0, and a value corresponding to the key is "AS09", indicating that the node AS09 is a customer node of the node AS0. It should be understood that AS nodes associated with AS numbers included in a column of "key" in the neighbor list shown in Table 3 are all neighboring nodes of the node AS0.

TABLE 3

| 1 | Neighbor List | | | |
|---|---|---|---|---|
| 2 | Key | | | Value |
| 3 | Provider | 1 | 1 | AS11, AS12 |
| 4 | Peer | 1 | 1 | AS21, AS22 |
| 5 | Customer | 1 | 2 | AS01, AS02, AS03, AS04, AS05, AS06, AS07, AS08 |
| 6 | Customer | 2 | 2 | AS09 |

It should be understood that the foregoing manner of storing the information used to indicate the business relationship between the AS node and each of the other AS nodes in the blockchain is merely an example for description. This application does not limit the information to be stored only in a manner of the neighbor list shown in Table 3. For example, alternatively, the information used to indicate the business relationship between the AS node and each of the other AS nodes may be stored in another explicit or implicit manner.

In an implementation of the step shown in S102, if the neighbor information of the AS node on the target path that is stored in the blockchain further includes information used to indicate a business relationship between an AS node and a neighboring node, and information used to indicate a transfer policy corresponding to the first route prefix, the first AS node may further determine, based on the information used to indicate the business relationship, the information used to indicate the transfer policy, and the first neighboring relationship that are stored in the blockchain, whether the target path for reaching the first route prefix does not match the transfer policy corresponding to the first route prefix, to identify whether a security threat exists on the target path. The AS node that has the first route prefix may set a transfer policy corresponding to the first route prefix. The transfer policy may be used to indicate whether another AS node (the another AS node may receive a route indication message for reaching the first route prefix to learn of a path for reaching the first route prefix) is allowed to indicate, to a provider node of the another AS node, a path for reaching the first route prefix. The AS node that has the first route prefix may further publish the transfer policy corresponding to the first route prefix to the blockchain.

Specifically, if the target path indicated by the first message is specifically used to indicate that the first AS node reaches a sixth AS node, the neighbor information of the AS node on the target path further includes information used to indicate a business relationship between the sixth AS node and the first AS node and information used to indicate a transfer policy corresponding to the first route prefix. The sixth AS node is an AS node on the target path. If the transfer policy, corresponding to the first route prefix, of the first AS node is used to indicate that the sixth AS node is not allowed to indicate the path for reaching the first route prefix to a provider node of the sixth AS node, and the first AS node determines, based on the information used to indicate the business relationship between the sixth AS node and the first AS node, that the first AS node is the provider node of the sixth AS node, the first AS node may determine that the target path does not match the transfer policy corresponding to the first route prefix. In this case, the first AS node determines that a security threat exists on the target path.

The network system 200 shown in FIG. 2 is still used as an example. If the first message received by the node AS5 indicates a target path for reaching the route prefix 16.0.0.0/16, the target path includes reaching the node AS4 from the node AS5. The route prefix 16.0.0.0/16 is a route prefix owned by the node AS1. The node AS5 may obtain, from the blockchain, the information used to indicate the business relationship between the node AS5 and the node AS4, and obtain the transfer policy corresponding to the route prefix 16.0.0.0/16. If the node AS5 determines, based on the transfer policy corresponding to the route prefix 16.0.0.0/16, that the transfer policy indicates that the node AS4 is not allowed to indicate the path for reaching the route prefix to a provider node of the node AS4, and if the node AS5 determines, based on the business relationship between the node AS5 and the node AS4, that the node AS5 is a provider node of the node AS4, the node AS5 may determine that the target path indicated by the first message does not match the transfer policy corresponding to the route prefix 16.0.0.0/166. In this case, the node AS5 may determine that a security threat exists on the target path.

For example, the neighbor information of the AS node on the target path that is stored in the blockchain may further include information used to indicate a transfer policy corresponding to a route prefix. The information may be published in the blockchain by an AS node that has the route prefix. In an implementation, the information used to indicate the transfer policy corresponding to the route prefix may be stored in a neighbor list shown in Table 4. As shown in Table 4, the neighbor information of the node AS0 stored in the blockchain in a form of the neighbor list may further include information about a route prefix (IP_prefix) owned by the node AS0 and information used to indicate a transfer policy corresponding to each route prefix.

It can be learned from content in the third row in Table 4 that the node AS0 has route prefixes IP_prefix_1, IP_prefix_2, and IP_prefix_3. A route transfer policy "AS21 (IP_prefix_2)" included in the fifth row in Table 4 indicates that AS02 is not allowed to transfer a path that is received by AS02 and that indicates how to reach the route prefix "IP_prefix_2" to an upstream node. A route transfer policy "AS09 (IP_prefix_1, IP_prefix_2, IP_prefix_3)" included in the fifth row in Table 4 indicates that AS09 is not allowed to transfer a path that is received by AS09 and that indicates how to reach the route prefixes "IP_prefix_1", "IP_prefix_2", and "IP_prefix_3" to an upstream node. In addition, based on Table 4, the node AS0 does not limit the node AS01 to transfer a path that is received by the node AS01 and that indicates how to reach the route prefixes "IP_prefix_1", "IP_prefix_2", and "IP_prefix_3" to an upstream node.

TABLE 4

| 1 | Neighbor information | | | |
|---|---|---|---|---|
| 2 | Key | | | Value |
| 3 | IP_prefix | | | IP_prefix_1; IP_prefix_2; IP_prefix_3 |
| 4 | Provider | 1 | 1 | AS11, AS12 |
| 5 | Peer | 1 | 1 | AS21 (IP_prefix_2), AS22 (IP_prefix_3) |
| 6 | Customer | 1 | 2 | AS01, AS02 (IP_prefix_1), AS03, AS04, AS05, AS06 (IP_prefix_2), AS07, AS08 (IP_prefix_2, IP_prefix_3) |
| 7 | Customer | 2 | 2 | AS09 (IP_prefix 1, IP_prefix_2, IP_prefix_3) |

It should be understood that the foregoing manner of storing the information used to indicate the transfer policy corresponding to the route prefix in the blockchain is merely an example for description. This application does not limit the information to be stored only in a manner of the neighbor list shown in Table 4. For example, alternatively, the information used to indicate the transfer policy corresponding to the route prefix may be stored in another explicit or implicit manner.

In this embodiment of this application, the first AS node may determine, based on the step shown in S102, whether a security threat exists on the target path indicated by the first message. If a determining result is that a security threat exists on the target path, the first AS node may discard the first message, to avoid updating, based on the first message, the route for reaching the first route prefix. Specifically, the first AS node may discard the first message after determining that a path tampering attack exists; and/or the first AS node may discard the first message after determining that route leakage occurs; and/or, the first AS node may discard the first message after determining that the target path for reaching the first route prefix does not match the transfer policy corresponding to the first route prefix.

In this embodiment of this application, the first AS node may further publish the neighbor information of the first AS node to the blockchain, and then another AS node in the blockchain may write the neighbor information into the blockchain, so that the blockchain stores the neighbor information. Specifically, the first AS node may publish, to the blockchain, some or all of information used to indicate all neighboring nodes of the first AS node, information used to indicate a business relationship between the first AS node and each of the neighboring nodes, or information used to indicate a transfer policy corresponding to a second route prefix. The first AS node has the second route prefix, and the transfer policy corresponding to the second route prefix is used to indicate whether another AS node is allowed to indicate a path (the path may be indicated to the another AS node by using a BGP update message) for reaching the second route prefix to a provider node of the another AS node.

The node AS0 shown in FIG. 5 is used as an example. The node AS0 may write the neighbor list shown in Table 4 into the blockchain. The neighbor list may include information used to indicate a neighboring node of the node AS0, information used to indicate a business relationship between the node AS0 and the neighboring node, and information used to indicate transfer policies respectively corresponding to the route prefixes IP_prefix_1, IP_prefix_2, and IP_prefix_3 owned by the node AS0.

In a possible implementation, the first AS node may invoke a smart contract deployed in the blockchain to initiate a transaction, and add the neighbor information to the transaction information, to publish the neighbor information of the first AS node to the blockchain by using the transaction. Specifically, the smart contract may be published by a blockchain node in the blockchain. The smart contract may be used to declare a type of an operation performed by the AS node on the neighbor information. For example, the smart contract may be used to declare that the AS node may write (write) the neighbor information into the blockchain, or perform a modification (update) or deletion (delete) operation on the neighbor information stored in the blockchain. After the smart contract is published, each blockchain node in the blockchain locally maintains execution of the smart contract. It should be understood that both the first AS node and an AS node on the blockchain other than the first AS node may initiate a transaction by using the smart contract deployed in the blockchain, to publish the neighbor information to the blockchain. Then, after verifying the transaction, the another AS node may locally write the neighbor information into the blockchain, so that the neighbor information is synchronized in the entire network.

When the AS node invokes the smart contract to initiate a transaction, if another node in the blockchain determines that the transaction is successfully verified, an operation requested by the smart contract may be performed on the neighbor information. For example, the AS node publishes the neighbor information to the blockchain by using a smart contract request. In this case, the another node may write the neighbor information of the AS node into the blockchain after determining that the transaction is successfully verified.

Figure 6:
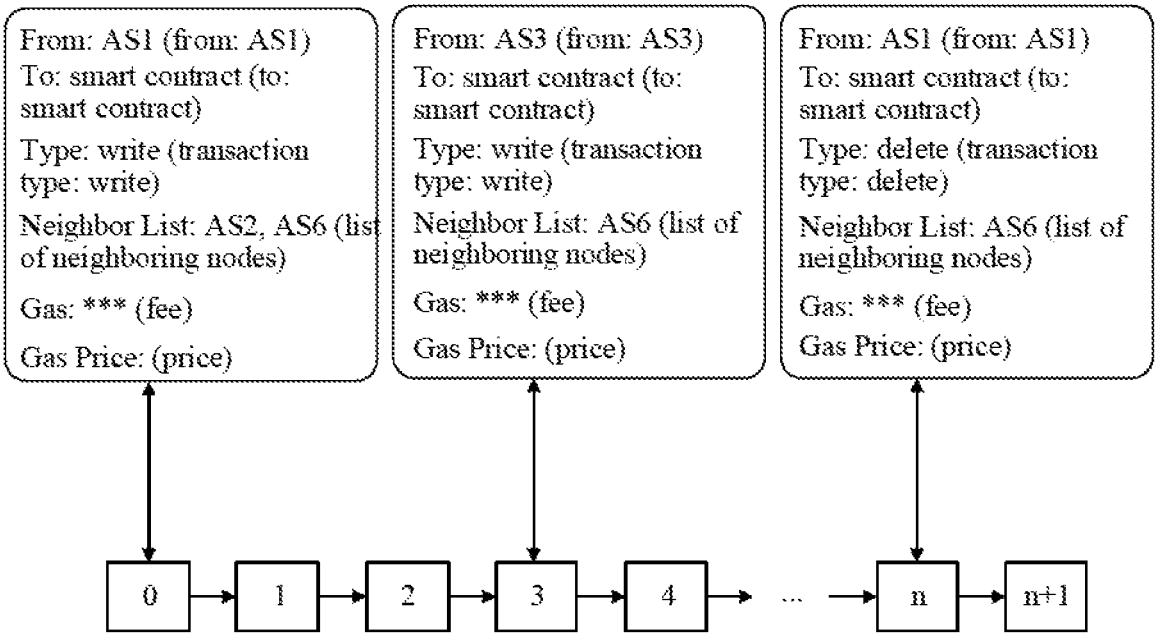
FIG. 6 is a schematic diagram of transaction information according to an embodiment of this application.

As shown in FIG. 6, it is assumed that blockchain nodes in the blockchain are respectively a node 0 to a node n+1. If the node AS1 invokes the smart contract to initiate a transaction, a transaction address included in transaction information of the transaction is an address of the smart contract, and a transaction type included in the transaction information is "write", it indicates that the node AS1 writes the neighbor information of the node AS1 into the blockchain for the first time. The transaction information further includes AS numbers AS2 and AS6, indicating that the node AS2 and the node AS6 are neighboring nodes of the node AS1. The transaction information may further include a fee (gas) and a corresponding fee value (gas price) of the transaction. The node 0 in the blockchain may write, based on the transaction initiated by the node AS1 and after the node 0 successfully verifies the transaction, the information used to indicate that the node AS2 and the node AS6 are neighboring nodes of the node AS1 into an account corresponding to the smart contract for storage (for example, the node 0 may write "Neighbor List: AS2, AS6" into the account corresponding to the smart contract for storage, to indicate that the node AS2 and the node AS6 are neighboring nodes of the node AS1), and write the transaction into the blockchain.

Further, if the node AS3 invokes the smart contract to initiate a transaction, where an address of the transaction is an address of the smart contract, and a transaction type is "write", it indicates that the node AS3 writes the neighbor information of the node AS3 into the blockchain for the first time. The transaction information further includes an AS number AS6, indicating that the node AS6 is a neighboring node of the node AS3. The node 3 in the blockchain may write, based on the transaction initiated by the node AS3, information used to indicate that the node AS6 is a neighboring node of the node AS3 into the account corresponding to the smart contract for storage, and write the transaction into the blockchain.

Further, if the node AS1 invokes the smart contract to initiate a transaction, where an address of the transaction is an address of the smart contract, and a transaction type is "delete", it indicates that the node AS1 deletes the neighbor information of the node AS3 that is stored in the blockchain. The transaction information further includes an AS number AS6, indicating that the node AS6 is a neighboring node of the node AS1. The node n in the blockchain may delete, based on the transaction initiated by the node AS1, information that is used to indicate that AS2 is a neighboring node of the node AS1 and that is stored in the account corresponding to the smart contract, reserve information that is used to indicate that the node AS6 is a neighboring node of the node AS1, and write the transaction into the blockchain.

In the foregoing manner, the first AS node may initiate a transaction by using the smart contract. After verifying the transaction, the blockchain node in the blockchain may write, by using the transaction, the neighbor information of the AS node into the account corresponding to the smart contract for storage, or modify or delete the neighbor information stored in the account corresponding to the smart contract, and write the transaction into the blockchain, to publish the neighbor information of the AS node to the blockchain.

It should be understood that, the neighbor information that is of the AS node on the target path, that is stored in the blockchain, and that is used in this application may alternatively be published by the AS node on the target path to the blockchain by using the foregoing method. After the neighbor information of the AS node is published to the blockchain, another node in the blockchain may write the neighbor information of the AS node into the blockchain based on the method shown above.

In an implementation, the AS node that invokes the smart contract to initiate the transaction may add the neighbor information to the transaction information. The neighbor information may be represented as the neighbor list shown in any one of Table 1 to Table 4. The blockchain node in the blockchain writes the transaction information into the blockchain after verifying the transaction, and in this way, the neighbor list shown in any one of Table 1 to Table 4 is published to the blockchain. The neighbor information written into the blockchain may be used by another AS node to verify, after obtaining the neighbor information, whether a security threat exists in a path indicated by a route indication message received by the another AS node.

Based on a same inventive concept as the foregoing method embodiments, an embodiment of this application further provides a network node. The network node may be configured to implement functions implemented by the first AS node in the foregoing method embodiments. It may be understood that, to implement the foregoing functions implemented by the first AS node, the network node may include a corresponding hardware structure and/or software module for performing each function. A person skilled in the art should easily be aware that, in combination with the example units and algorithm steps described in the embodiments disclosed in this specification, the network node can be implemented by hardware, computer software, or a combination of hardware and computer software. Whether a function of the network node is performed by hardware or hardware driven by computer software depends on particular applications and design constraints of the technical solutions.

In a possible implementation, the network node provided in this embodiment of this application may have a structure of the network node 300 shown in FIG. 3.

Based on the structure, the transceiver 303 may be configured to receive a first message, where the first message is used to indicate a target path for reaching a first route prefix, and the target path is used to indicate a first neighboring relationship between AS nodes on the target path. The processor 301 may be configured to invoke the program instruction stored in the memory to determine, based on the first neighboring relationship and neighbor information of an AS node on the target path that is stored in a blockchain, whether a security threat exists on the target path.

In a possible implementation, if the neighbor information includes a second neighboring relationship, and the second neighboring relationship is used to indicate all neighboring nodes of the AS node on the target path, when determining, based on the first neighboring relationship and the neighbor information of the AS node on the target path that is stored in the blockchain, whether a security threat exists on the target path, the processor 301 may be specifically configured to: determine whether the second neighboring relationship matches the first neighboring relationship, and if the second neighboring relationship matches the first neighboring relationship, determine that no security threat exists on the target path; or if the second neighboring relationship does not match the first neighboring relationship, determine that a security threat exists on the target path.

If the first neighboring relationship specifically indicates that a second AS node is a neighboring node of a third AS node, where the second AS node has the first route prefix, and the second neighboring relationship is specifically used to indicate all neighboring nodes of the second AS node, when determining whether the second neighboring relationship matches the first neighboring relationship, the processor 301 may be specifically configured to: determine, based on the second neighboring relationship, whether the third AS node is one of all neighboring nodes of the second AS node, and if yes, determine that the second neighboring relationship matches the first neighboring relationship; otherwise, determine that the second neighboring relationship does not match the first neighboring relationship.

If the first neighboring relationship is used to indicate a neighboring node, on the target path, of each AS node on the target path, and the second neighboring relationship is specifically used to indicate all neighboring nodes of each AS node, when determining whether the second neighboring relationship matches the first neighboring relationship, the processor 301 may be specifically configured to determine, based on the second neighboring relationship, whether the neighboring node of each AS node on the target path matches all the neighboring nodes of each AS node that are indicated by the second neighboring relationship. If yes, it may be determined that the second neighboring relationship matches the first neighboring relationship. Otherwise, it is determined that the second neighboring relationship does not match the first neighboring relationship.

In a possible implementation, if the neighbor information includes information used to indicate a business relationship between an AS node and a neighboring node on the target path, when determining, based on the first neighboring relationship and the neighbor information of the AS node on the target path that is stored in the blockchain, whether a security threat exists on the target path, the processor 301 is specifically configured to determine, based on the first neighboring relationship and the information used to indicate the business relationship, whether route leakage occurs. If yes, it may be determined that a security threat exists on the target path. Otherwise, it may be determined that no security threat exists on the target path.

In a possible implementation, if the neighbor information includes information used to indicate a business relationship between an AS node and a neighboring node on the target path, and information used to indicate a transfer policy corresponding to the first route prefix, when determining, based on the first neighboring relationship and the neighbor information of the AS node on the target path that is stored in the blockchain, whether a security threat exists on the target path, the processor 301 is specifically configured to determine, based on the information used to indicate the business relationship, the information used to indicate the transfer policy corresponding to the first route prefix, and the first neighboring relationship, whether the target path matches the transfer policy. If yes, it may be determined that a security threat exists on the target path. Otherwise, it may be determined that no security threat exists on the target path.

In this application, after determining that a security threat exists on the target path, the processor 301 may further discard the first message.

In addition, before the transceiver 303 receives the first message, the processor 301 may further publish the neighbor information of the first AS node to the blockchain. The neighbor information of the first AS node includes some or all of the following information: information used to indicate all neighboring nodes of the first AS node; information used to indicate a business relationship between the first AS node and a neighboring node, where the business relationship is used to indicate that the first AS node has a customer customer relationship, a service provider provider relationship, or a peer peer relationship with the another AS node; or information used to indicate a transfer policy corresponding to a second route prefix. The first AS node has the second route prefix. The transfer policy for the second route prefix is used to indicate whether an AS node that receives a second message is allowed to indicate a path for reaching the second route prefix to a provider node of the AS node that receives the second message. The second message is used to indicate the path for reaching the second route prefix.

It should be understood that a processor 1202 in this application may be a central processing unit (CPU), a network processor (NP), or a combination of a CPU and an NP. A memory 1203 may be a random-access memory (RAM), a read-only memory (ROM), or the like.

In a possible implementation, the network node provided in this embodiment of this application may alternatively be implemented by using a modular structure. For example, the network node may have a structure of a network node 700 shown in FIG. 7. It can be learned that the network node 700 may include a transceiver unit 701 and a processing unit 702.

Based on the structure, the transceiver unit 701 may be configured to receive a first message, where the first message is used to indicate a target path for reaching a first route prefix, and the target path is used to indicate a first neighboring relationship between AS nodes on the target path. The processing unit 702 may be configured to determine, based on the first neighboring relationship and neighbor information of an AS node on the target path that is stored in a blockchain, whether a security threat exists on the target path.

In a possible implementation, if the neighbor information includes a second neighboring relationship, and the second neighboring relationship is used to indicate all neighboring nodes of the AS node on the target path, when determining, based on the first neighboring relationship and the neighbor information of the AS node on the target path that is stored in the blockchain, whether a security threat exists on the target path, the processing unit 702 may be specifically configured to: determine whether the second neighboring relationship matches the first neighboring relationship, and if the second neighboring relationship matches the first neighboring relationship, determine that no security threat exists on the target path; or if the second neighboring relationship does not match the first neighboring relationship, determine that a security threat exists on the target path.

If the first neighboring relationship specifically indicates that a second AS node is a neighboring node of a third AS node, where the second AS node has the first route prefix, and the second neighboring relationship is specifically used to indicate all neighboring nodes of the second AS node, when determining whether the second neighboring relationship matches the first neighboring relationship, the processing unit 702 may be specifically configured to: determine, based on the second neighboring relationship, whether the third AS node is one of all neighboring nodes of the second AS node, and if yes, determine that the second neighboring relationship matches the first neighboring relationship; otherwise, determine that the second neighboring relationship does not match the first neighboring relationship.

If the first neighboring relationship is used to indicate a neighboring node, on the target path, of each AS node on the target path, and the second neighboring relationship is specifically used to indicate all neighboring nodes of each AS node, when determining whether the second neighboring relationship matches the first neighboring relationship, the processing unit 702 may be specifically configured to determine, based on the second neighboring relationship, whether the neighboring node of each AS node on the target path matches all the neighboring nodes of each AS node that are indicated by the second neighboring relationship. If yes, it may be determined that the second neighboring relationship matches the first neighboring relationship. Otherwise, it is determined that the second neighboring relationship does not match the first neighboring relationship.

In a possible implementation, if the neighbor information includes information used to indicate a business relationship between an AS node and a neighboring node on the target path, when determining, based on the first neighboring relationship and the neighbor information of the AS node on the target path that is stored in the blockchain, whether a security threat exists on the target path, the processing unit 702 is specifically configured to determine, based on the first neighboring relationship and the information used to indicate the business relationship, whether route leakage occurs. If yes, it may be determined that a security threat exists on the target path. Otherwise, it may be determined that no security threat exists on the target path.

In a possible implementation, if the neighbor information includes information used to indicate a business relationship between an AS node and a neighboring node on the target path, and information used to indicate a transfer policy corresponding to the first route prefix, when determining, based on the first neighboring relationship and the neighbor information of the AS node on the target path that is stored in the blockchain, whether a security threat exists on the target path, the processing unit 702 is specifically configured to determine, based on the information used to indicate the business relationship, the information used to indicate the transfer policy corresponding to the first route prefix, and the first neighboring relationship, whether the target path matches the transfer policy. If yes, it may be determined that a security threat exists on the target path. Otherwise, it may be determined that no security threat exists on the target path.

In this application, after determining that a security threat exists on the target path, the processing unit 702 may further discard the first message.

In addition, before the transceiver 303 receives the first message, the processing unit 702 may further publish the neighbor information of the first AS node to the blockchain. The neighbor information of the first AS node includes some or all of the following information: information used to indicate all neighboring nodes of the first AS node; information used to indicate a business relationship between the first AS node and a neighboring node, where the business relationship is used to indicate that the first AS node has a customer customer relationship, a service provider provider relationship, or a peer peer relationship with the another AS node; or information used to indicate a transfer policy corresponding to a second route prefix. The first AS node has the second route prefix. The transfer policy for the second route prefix is used to indicate whether an AS node that receives a second message is allowed to indicate a path for reaching the second route prefix to a provider node of the AS node that receives the second message. The second message is used to indicate the path for reaching the second route prefix.

Figure 7:
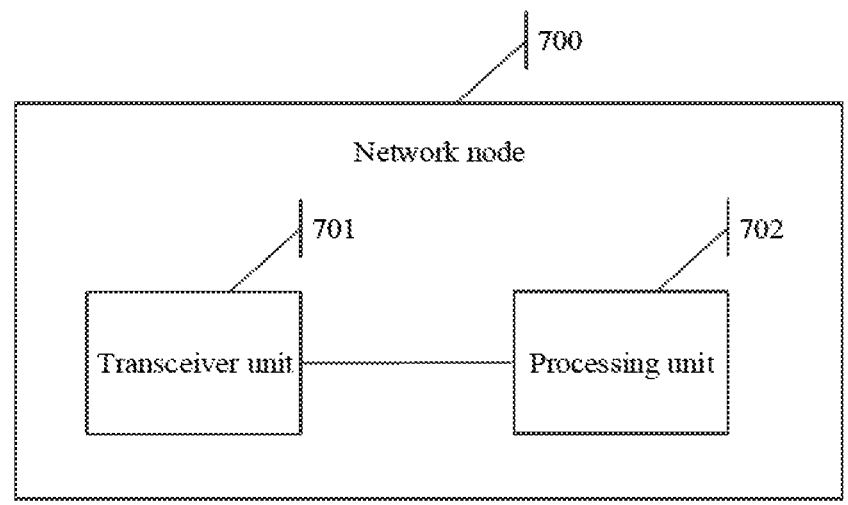
FIG. 7 is a schematic structural diagram of another network device according to an embodiment of this application.

It should be understood that the network node 700 shown in FIG. 7 may alternatively be implemented by using the network node 300 shown in FIG. 3. Specifically, a function of the transceiver unit 701 may be implemented by the transceiver 303. A function of the processing unit 702 may be implemented by the processor 301 by invoking the program instruction in the memory 302.

In addition, it should be understood that, in this application, the foregoing network node is not excluded from being implemented by a chip or a chip system. The chip may be coupled to the memory and the transceiver, and is configured to execute the program instruction in the memory, to implement a function of the first AS node in the foregoing method implementation. "Coupling" means that two components are directly or indirectly combined with each other. The combination may be fixed or mobile, and the combination may allow communication between the two components by using a flowing liquid, electricity, an electric signal, or another type of signal. The chip system may include the chip.

Based on a same concept as the foregoing method embodiments, an embodiment of this application further provides another computer-readable storage medium, storing code. When the code is invoked and executed by a computer, the computer is enabled to implement an operation performed by the first AS node in any one of the foregoing method embodiments or the possible implementations of the method embodiments. In this embodiment of this application, the computer-readable storage medium is not limited, and may be, for example, a RAM or a ROM.

Based on a same concept as the foregoing method embodiments, this application further provides a computer program product. When the computer program product is invoked and executed by a computer, the computer may be enabled to implement an operation performed by the first AS node in any one of the foregoing method embodiments and the possible implementations of the method embodiments.

Based on a same concept as the foregoing method embodiments, this application further provides a communications system. The communications system may be configured to implement an operation performed by the first AS node in any one of the foregoing method embodiments or the possible implementations of the foregoing method embodiments. The communications system may include the first AS node in this application. For example, the communications system has a structure shown in FIG. 1.

The embodiments of this application are described with reference to the flowcharts and/or block diagrams of the method, the apparatus, and the computer program product in the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The invention claimed is:

1. A secure route identification method, comprising:
receiving, by a first autonomous system (AS) node, a first message, wherein the first message indicates a target path for reaching a first route prefix, and the target path indicates a first neighboring relationship between AS nodes on the target path; and
determining, by the first AS node based on the first neighboring relationship and the neighbor information of an AS node on the target path that is stored in a blockchain, whether a security threat exists on the target path,
wherein the neighbor information comprises a second neighboring relationship, and the second neighboring relationship indicates all neighboring nodes of the AS node on the target path,
wherein the determining includes checking, by the first AS node, whether the second neighboring relationship matches the first neighboring relationship,
wherein with the second neighboring relationship matching the first neighboring relationship, the determining determines that no security threat exists on the target path,
wherein with the second neighboring relationship not matching the first neighboring relationship, the determining determines that the security threat exists on the target path,
wherein the first neighboring relationship indicates that a second AS node is a neighboring node of a third AS node,
wherein the second AS node has the first route prefix, the second neighboring relationship indicates all neighboring nodes of the second AS node,
wherein the determining further includes checking whether the third AS node is one of all neighboring nodes of the second AS node,
wherein with the third AS node being one of all the neighboring nodes of the second AS node, the determining determines, by the first AS node, that the second neighboring relationship matches the first neighboring relationship, and
wherein with the third AS node not being one of all the neighboring nodes of the second AS node, the determining determines, by the first AS node, that the second neighboring relationship does not match the first neighboring relationship.

2. The method according to claim 1,
wherein the neighbor information comprises information used to indicate a business relationship between an AS node and a neighboring node on the target path,
wherein the determining includes checking, by the first AS node based on the first neighboring relationship and the information used to indicate the business relationship, whether route leakage occurs,
wherein with route leakage occurring, the determining determines that a security threat exists on the target path, and
wherein with no route leakage occurring, the determining determines that no security threat exists on the target path.

3. The method according to claim 1,
wherein the neighbor information comprises information used to indicate a business relationship between an AS node and a neighboring node on the target path and information used to indicate a transfer policy corresponding to the first route prefix,
wherein the determining includes checking, by the first AS node based on the information used to indicate the business relationship, the information used to indicate the transfer policy corresponding to the first route prefix, and the first neighboring relationship, whether the target path matches the transfer policy,
wherein with the target path matching the transfer policy, the determining determines that the security threat exists on the target path, and
wherein with the target path not matching the transfer policy, the determining determines that no security threat exists on the target path.

4. The method according to claim 1, wherein after the determining, by the first AS node, that the security threat exists on the target path, the method further comprises discarding, by the first AS node, the first message.

5. The method according to claim 1, wherein before the receiving, by the first AS node, the first message, the method further comprises publishing, by the first AS node, neighbor information of the first AS node to the blockchain, wherein the neighbor information of the first AS node comprises at least one of the following information:
information used to indicate all neighboring nodes of the first AS node;
information used to indicate a business relationship between the first AS node and a neighboring node, wherein the business relationship indicates that the first AS node has a customer-customer relationship, a service provider-provider relationship, or a peer-peer relationship with the neighboring node; and
information used to indicate a transfer policy corresponding to a second route prefix, wherein the first AS node has the second route prefix, the transfer policy for the second route prefix indicates whether an AS node that receives a second message is allowed to indicate a path for reaching the second route prefix to a provider node of the AS node that receives the second message, and the second message indicates the path for reaching the second route prefix.

6. A secure route identification method, comprising:
receiving, by a first autonomous system (AS) node, a first message, wherein the first message indicates a target path for reaching a first route prefix, and the target path indicates a first neighboring relationship between AS nodes on the target path; and
determining, by the first AS node based on the first neighboring relationship and the neighbor information of an AS node on the target path that is stored in a blockchain, whether a security threat exists on the target path,
wherein the neighbor information comprises a second neighboring relationship, and the second neighboring relationship indicates all neighboring nodes of the AS node on the target path,
wherein the determining includes checking, by the first AS node, whether the second neighboring relationship matches the first neighboring relationship,
wherein with the second neighboring relationship matching the first neighboring relationship, the determining determines that no security threat exists on the target path, wherein with the second neighboring relationship not matching the first neighboring relationship, the determining determines that the security threat exists on the target path, wherein the first neighboring relationship indicates a neighboring node, on the target path, of each AS node on the target path, and the second neighboring relationship indicates all neighboring nodes of each AS node, wherein the determining further includes checking whether the neighboring node of each AS node on the target path matches all the neighboring nodes of each AS node that are indicated by the second neighboring relationship, wherein with the neighboring node of each AS node on the target path matching all the neighboring nodes of each AS node that are indicated by the second neighboring relationship, the determining determines, by the first AS node, that the second neighboring relationship matches the first neighboring relationship, and wherein with the neighboring node of each AS node on the target path not matching all the neighboring nodes of each AS node that are indicated by the second neighboring relationship, the determining determines, by the first AS node, that the second neighboring relationship does not match the first neighboring relationship.

7. The method according to claim 6, wherein the neighbor information comprises information used to indicate a business relationship between an AS node and a neighboring node on the target path, wherein the determining includes checking, by the first AS node based on the first neighboring relationship and the information used to indicate the business relationship, whether route leakage occurs, wherein with route leakage occurring, the determining determines that a security threat exists on the target path, and wherein with no route leakage occurring, the determining determines that no security threat exists on the target path.

8. The method according to claim 6, wherein the neighbor information comprises information used to indicate a business relationship between an AS node and a neighboring node on the target path and information used to indicate a transfer policy corresponding to the first route prefix, wherein the determining includes checking, by the first AS node based on the information used to indicate the business relationship, the information used to indicate the transfer policy corresponding to the first route prefix, and the first neighboring relationship, whether the target path matches the transfer policy, wherein with the target path matching the transfer policy, the determining determines that the security threat exists on the target path, and wherein with the target path not matching the transfer policy, the determining determines that no security threat exists on the target path.

9. The method according to claim 6, wherein after the determining, by the first AS node, that the security threat exists on the target path, the method further comprises discarding, by the first AS node, the first message.

10. The method according to claim 6, wherein before the receiving, by the first AS node, the first message, the method further comprises publishing, by the first AS node, neighbor information of the first AS node to the blockchain, wherein the neighbor information of the first AS node comprises at least one of the following information:

information used to indicate all neighboring nodes of the first AS node;

information used to indicate a business relationship between the first AS node and a neighboring node, wherein the business relationship indicates that the first AS node has a customer-customer relationship, a service provider-provider relationship, or a peer-peer relationship with the neighboring node; and information used to indicate a transfer policy corresponding to a second route prefix, wherein the first AS node has the second route prefix, the transfer policy for the second route prefix indicates whether an AS node that receives a second message is allowed to indicate a path for reaching the second route prefix to a provider node of the AS node that receives the second message, and the second message indicates the path for reaching the second route prefix.

11. A network node, comprising a transceiver and a processor, wherein the transceiver is configured to receive a first message, wherein the first message indicates a target path for reaching a first route prefix, and the target path indicates a first neighboring relationship between autonomous system (AS) nodes on the target path, wherein the processor is configured to determine, based on the first neighboring relationship and the neighbor information of an AS node on the target path that is stored in the blockchain, whether a security threat exists on the target path, wherein the neighbor information comprises a second neighboring relationship, and the second neighboring relationship is used to indicate all neighboring nodes of the AS node on the target path, wherein the determining by the processor includes checking whether the second neighboring relationship matches the first neighboring relationship, wherein with the second neighboring relationship matching the first neighboring relationship, the determining by the processor determines that no security threat exists on the target path, wherein with the second neighboring relationship not matching the first neighboring relationship, the determining by the processor determines that the security threat exists on the target path, wherein the first neighboring relationship indicates that a second AS node is a neighboring node of a third AS node, wherein the second AS node has the first route prefix, and the second neighboring relationship indicates all neighboring nodes of the second AS node, wherein the determining by the processor further includes checking whether the third AS node is one of all neighboring nodes of the second AS node, wherein with the third AS node being one of all the neighboring nodes of the second AS node, the determining by the processor determines that the second neighboring relationship matches the first neighboring relationship, and wherein with the third AS node not being one of all the neighboring nodes of the second AS node, the determining by the processor determines that the second neighboring relationship does not match the first neighboring relationship.

12. The network node according to claim 11,
wherein the neighbor information comprises information used to indicate a business relationship between an AS node and a neighboring node on the target path,
wherein the determining by the processor includes checking, based on the first neighboring relationship and the information used to indicate the business relationship, whether route leakage occurs,
wherein with route leakage occurring, the determining by the processor determines that the security threat exists on the target path, and
wherein with no route leakage occurring, the determining by the processor determines that no security threat exists on the target path.

13. The network node according to claim 11,
wherein the neighbor information comprises information used to indicate a business relationship between an AS node and a neighboring node on the target path and information used to indicate a transfer policy corresponding to the first route prefix,
wherein the determining by the processor includes checking, based on the information used to indicate the business relationship, the information used to indicate the transfer policy corresponding to the first route prefix, and the first neighboring relationship, whether the target path matches the transfer policy,
wherein with the target path matching the transfer policy, the determining by the processor determines that a security threat exists on the target path, and
wherein with the target path not matching the transfer policy, the determining by the processor determines that no security threat exists on the target path.

14. The network node according to claim 11, wherein after the determining that the security threat exists on the target path, the processor is further configured to discard the first message.

15. The network node according to claim 11, wherein before the transceiver unit receives the first message, the processing unit is further configured to publish neighbor information of the first AS node to the blockchain, wherein the neighbor information of the first AS node comprises at least one of the following information:
information used to indicate all neighboring nodes of the first AS node;
information used to indicate a business relationship between the first AS node and a neighboring node, wherein the business relationship indicates that the first AS node has a customer-customer relationship, a service provider-provider relationship, or a peer-peer relationship with the neighboring node; and
information used to indicate a transfer policy corresponding to a second route prefix, wherein the first AS node has the second route prefix, the transfer policy for the second route prefix indicates whether an AS node that receives a second message is allowed to indicate a path for reaching the second route prefix to a provider node of the AS node that receives the second message, and the second message indicates the path for reaching the second route prefix.

16. A network node, comprising a transceiver and a processor,
wherein the transceiver is configured to receive a first message,
wherein the first message indicates a target path for reaching a first route prefix, and the target path indicates a first neighboring relationship between autonomous system (AS) nodes on the target path,
wherein the processor is configured to determine, based on the first neighboring relationship and the neighbor information of an AS node on the target path that is stored in the blockchain, whether a security threat exists on the target path,
wherein the neighbor information comprises a second neighboring relationship, and the second neighboring relationship is used to indicate all neighboring nodes of the AS node on the target path,
wherein the determining by the processor includes checking whether the second neighboring relationship matches the first neighboring relationship,
wherein with the second neighboring relationship matching the first neighboring relationship, the determining by the processor determines that no security threat exists on the target path,
wherein with the second neighboring relationship not matching the first neighboring relationship, the determining by the processor determines that the security threat exists on the target path,
wherein the first neighboring relationship indicates a neighboring node, on the target path, of each AS node on the target path, and the second neighboring relationship indicates all neighboring nodes of each AS node,
wherein the determining by the processor further includes checking whether the neighboring node of each AS node on the target path matches all the neighboring nodes of each AS node that are indicated by the second neighboring relationship,
wherein with the neighboring node of each AS node on the target path matching all the neighboring nodes of each AS node that are indicated by the second neighboring relationship, the determining by the processor determines that the second neighboring relationship matches the first neighboring relationship, and
wherein with the neighboring node of each AS node on the target path not matching all the neighboring nodes of each AS node that are indicated by the second neighboring relationship, the determining by the processor determines that the second neighboring relationship does not match the first neighboring relationship.

17. The network node according to claim 16,
wherein the neighbor information comprises information used to indicate a business relationship between an AS node and a neighboring node on the target path,
wherein the determining by the processor includes checking, based on the first neighboring relationship and the information used to indicate the business relationship, whether route leakage occurs,
wherein with route leakage occurring, the determining by the processor determines that the security threat exists on the target path, and
wherein with no route leakage occurring, the determining by the processor determines that no security threat exists on the target path.

18. The network node according to claim 16,
wherein the neighbor information comprises information used to indicate a business relationship between an AS node and a neighboring node on the target path and information used to indicate a transfer policy corresponding to the first route prefix,
wherein the determining by the processor includes checking, based on the information used to indicate the business relationship, the information used to indicate the transfer policy corresponding to the first route prefix, and the first neighboring relationship, whether the target path matches the transfer policy, wherein with the target path matching the transfer policy, the determining by the processor determines that a security threat exists on the target path, and wherein with the target path not matching the transfer policy, the determining by the processor determines that no security threat exists on the target path.

19. The network node according to claim 16, wherein after the determining that the security threat exists on the target path, the processor is further configured to discard the first message.

20. The network node according to claim 16, wherein before the transceiver unit receives the first message, the processing unit is further configured to publish neighbor information of the first AS node to the blockchain, wherein the neighbor information of the first AS node comprises at least one of the following information:

information used to indicate all neighboring nodes of the first AS node;

information used to indicate a business relationship between the first AS node and a neighboring node, wherein the business relationship indicates that the first AS node has a customer-customer relationship, a service provider-provider relationship, or a peer-peer relationship with the neighboring node; and information used to indicate a transfer policy corresponding to a second route prefix, wherein the first AS node has the second route prefix, the transfer policy for the second route prefix indicates whether an AS node that receives a second message is allowed to indicate a path for reaching the second route prefix to a provider node of the AS node that receives the second message, and the second message indicates the path for reaching the second route prefix.

* * * * *